Figure 1:
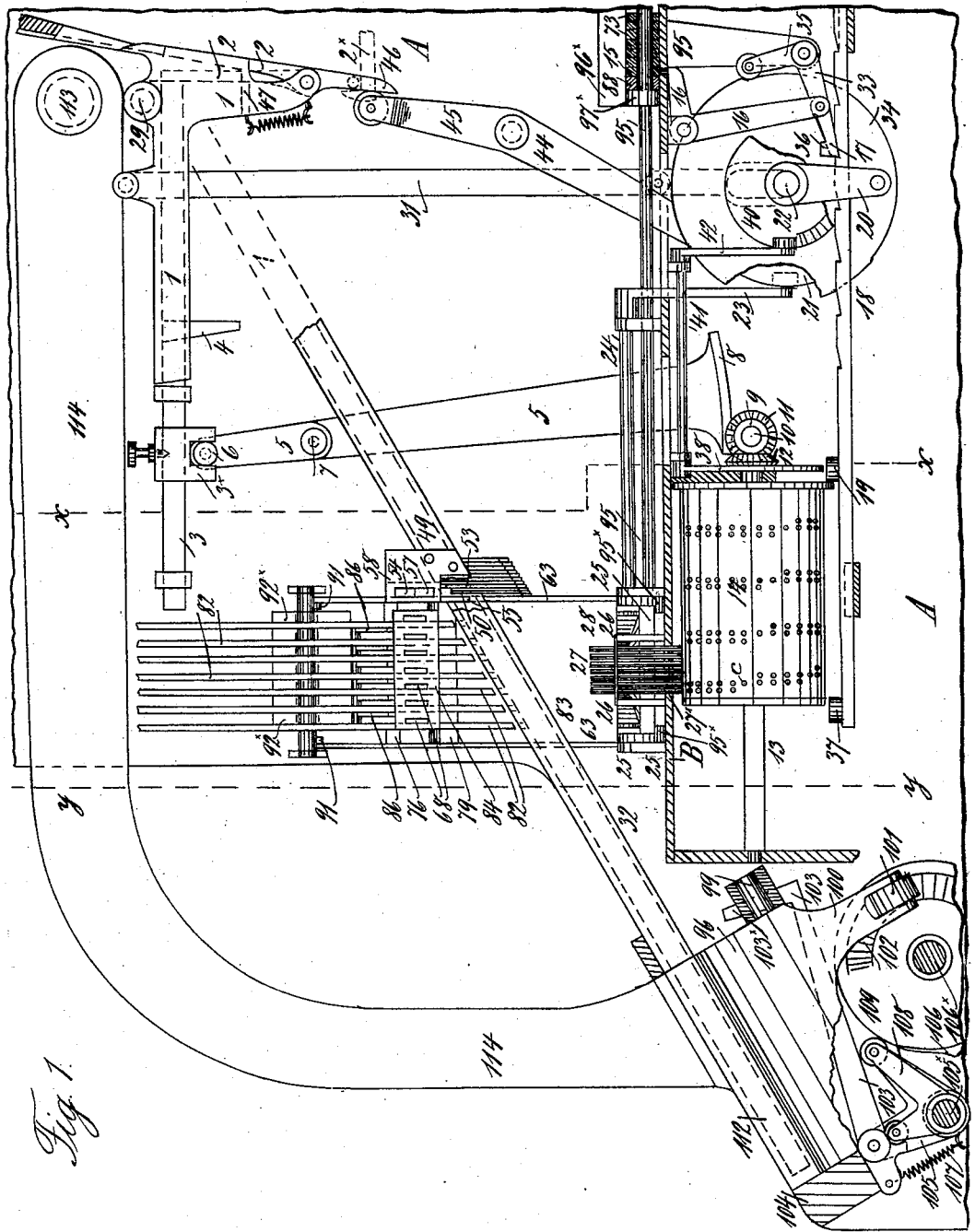

(No Model.) 9 Sheets—Sheet 1.

E. WENTSCHER.
JUSTIFYING DEVICE FOR TYPE SETTING OR OTHER MACHINES.

No. 605,618. Patented June 14, 1898.

Witnesses.
Franz Mandl
Wilhelm Giese

Inventor.
Ernst Wentscher

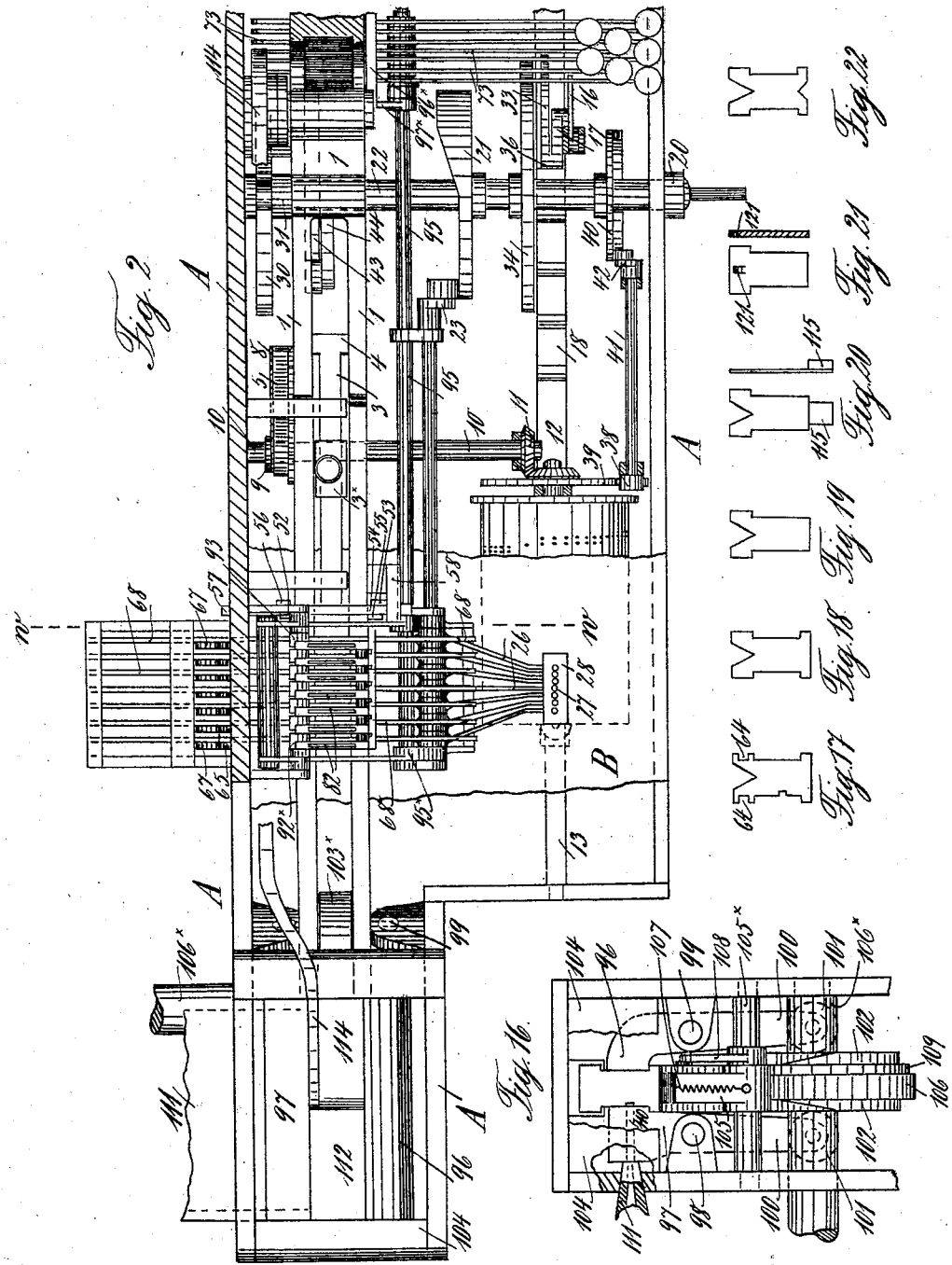

(No Model.) 9 Sheets—Sheet 3.
E. WENTSCHER.
JUSTIFYING DEVICE FOR TYPE SETTING OR OTHER MACHINES.
No. 605,618. Patented June 14, 1898.
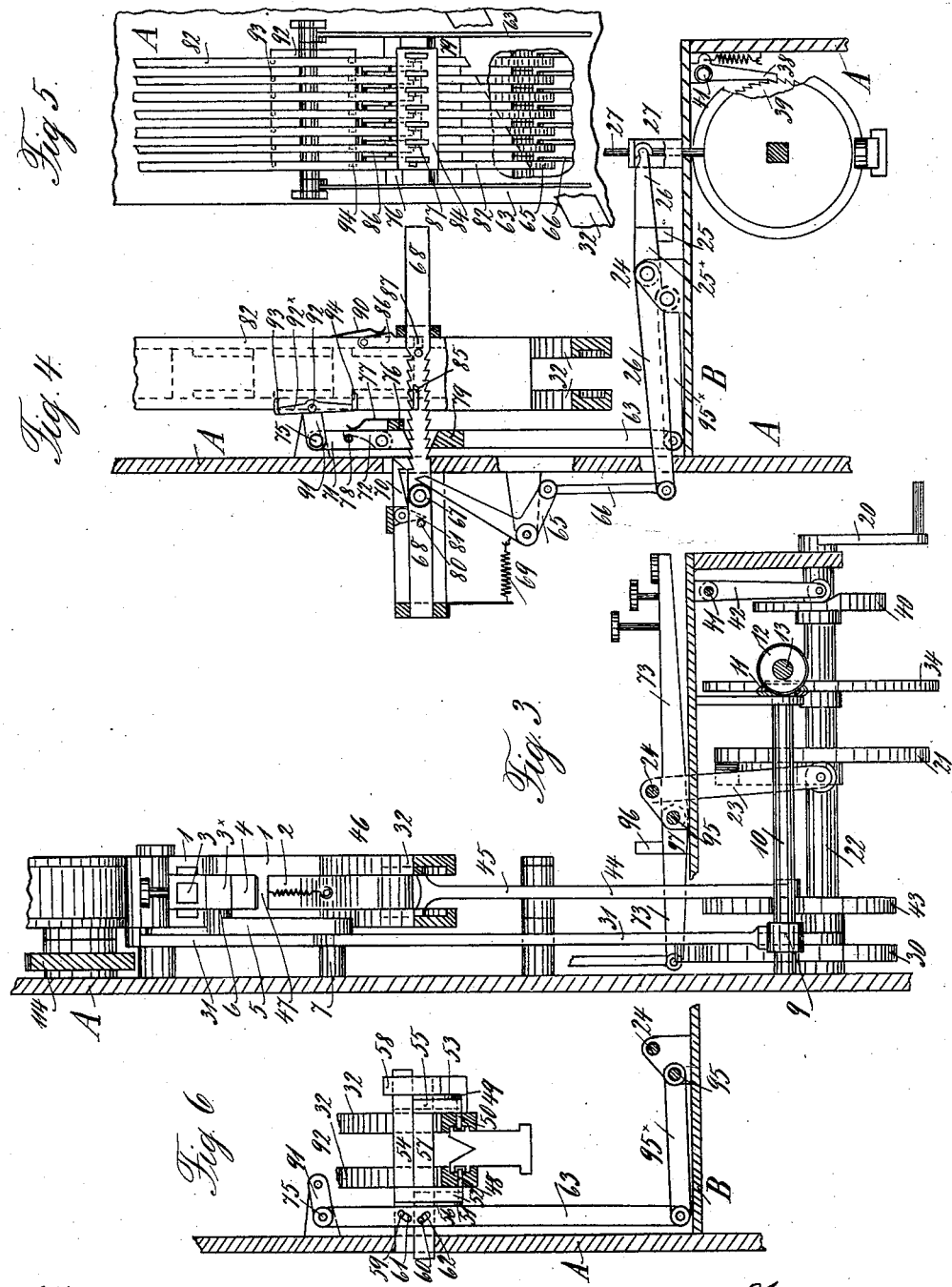
Witnesses.
Inventor.
Ernst Wentscher

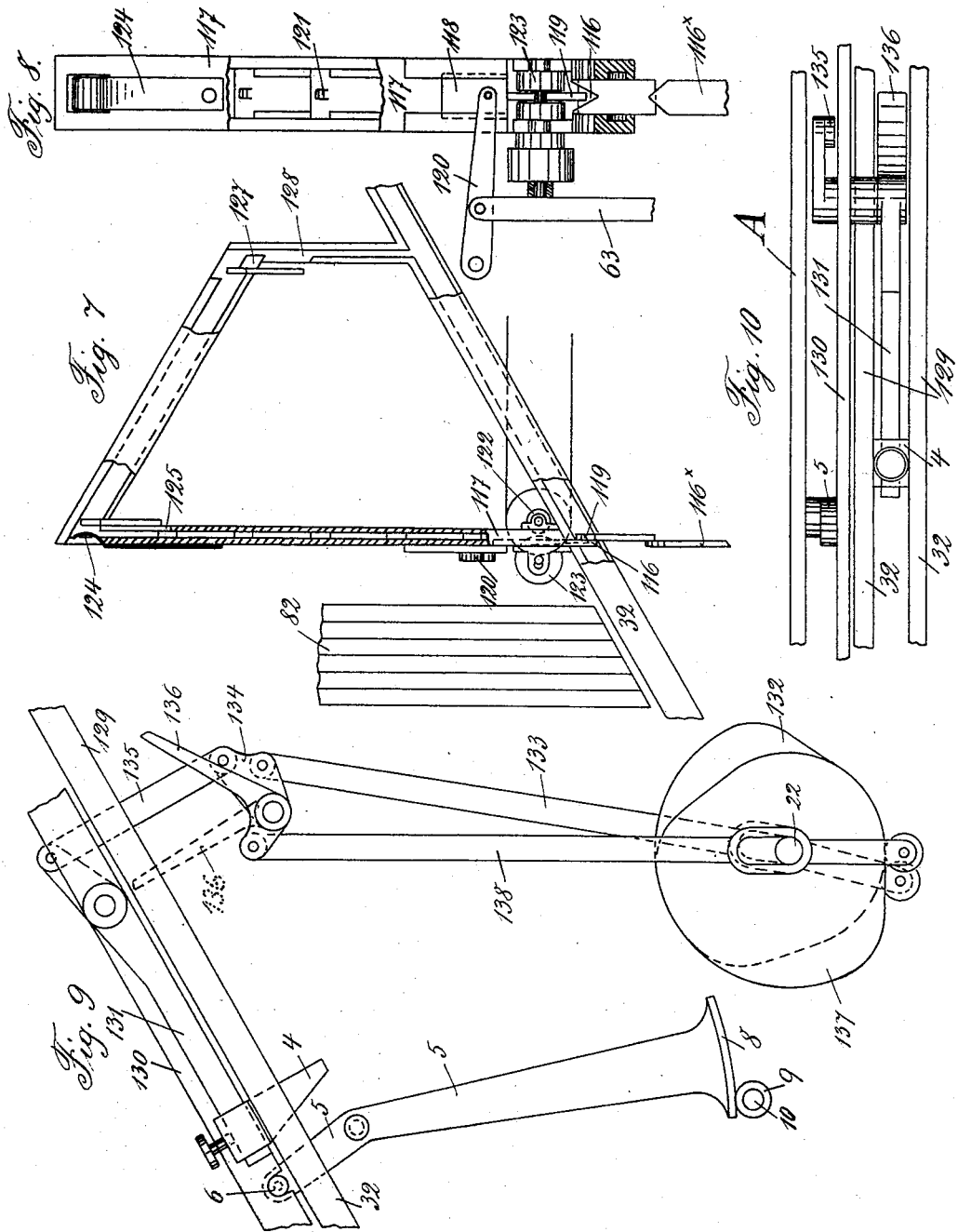

(No Model.) 9 Sheets—Sheet 5.
E. WENTSCHER.
JUSTIFYING DEVICE FOR TYPE SETTING OR OTHER MACHINES.
No. 605,618. Patented June 14, 1898.
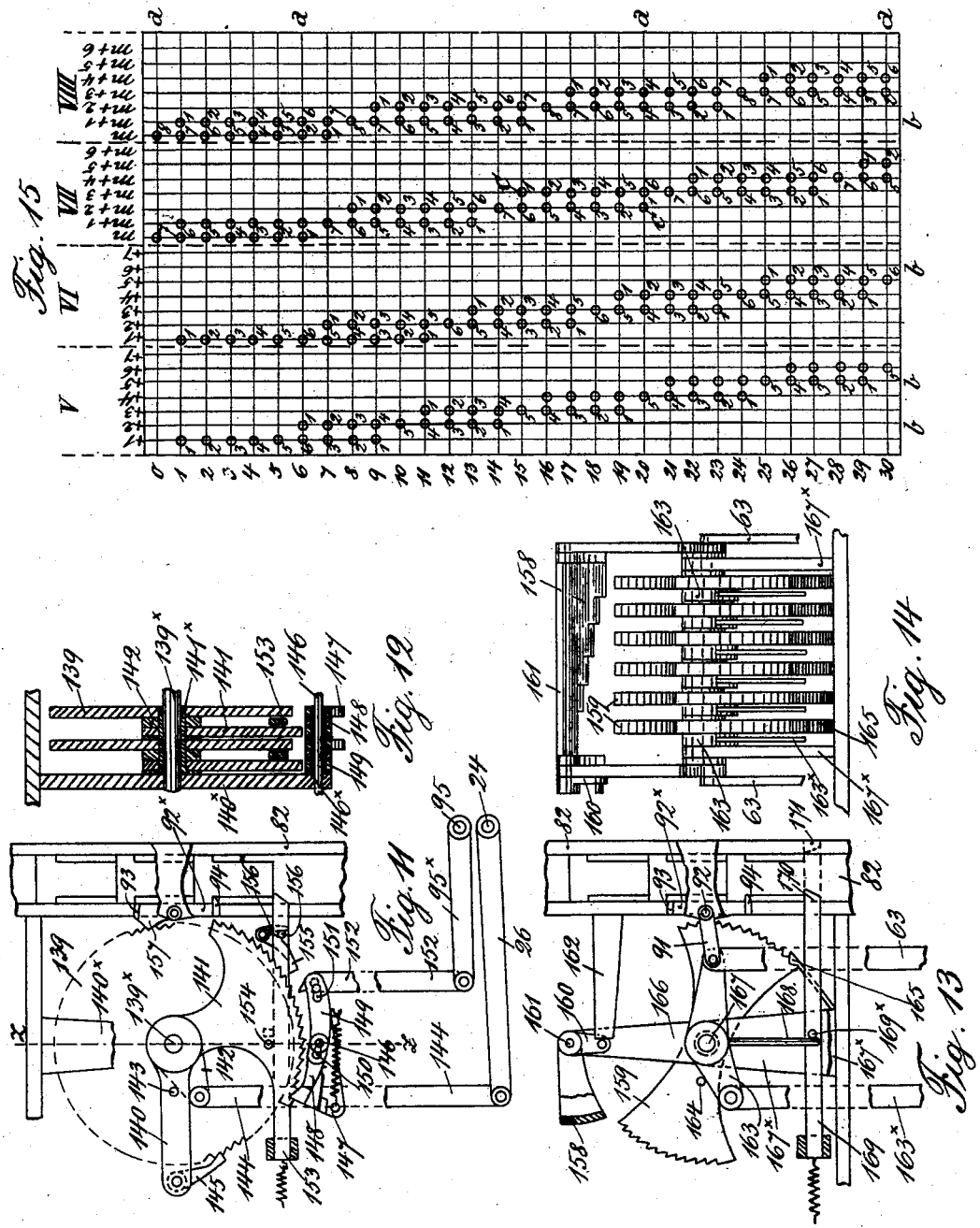

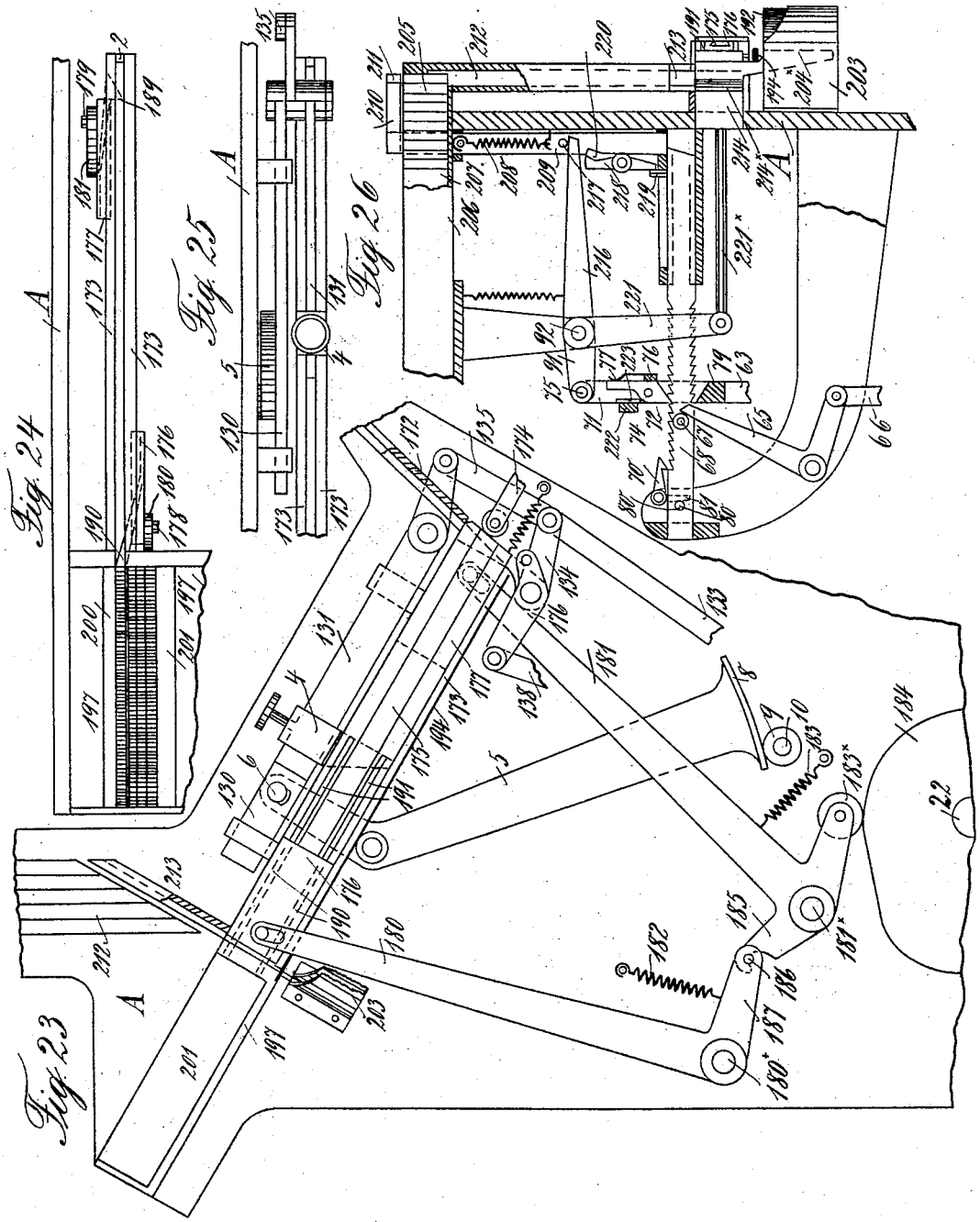

(No Model.) 9 Sheets—Sheet 7.
E. WENTSCHER.
JUSTIFYING DEVICE FOR TYPE SETTING OR OTHER MACHINES.
No. 605,618. Patented June 14, 1898.
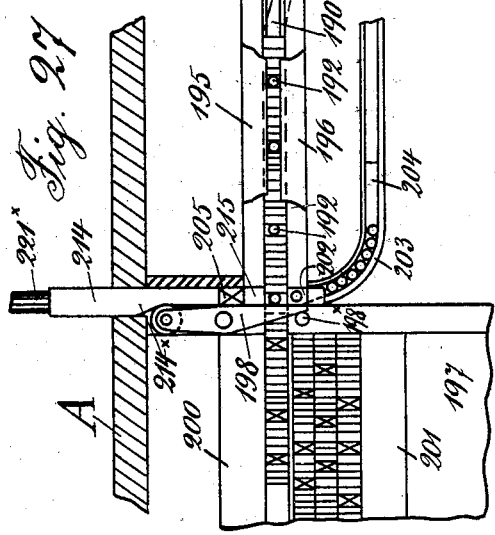
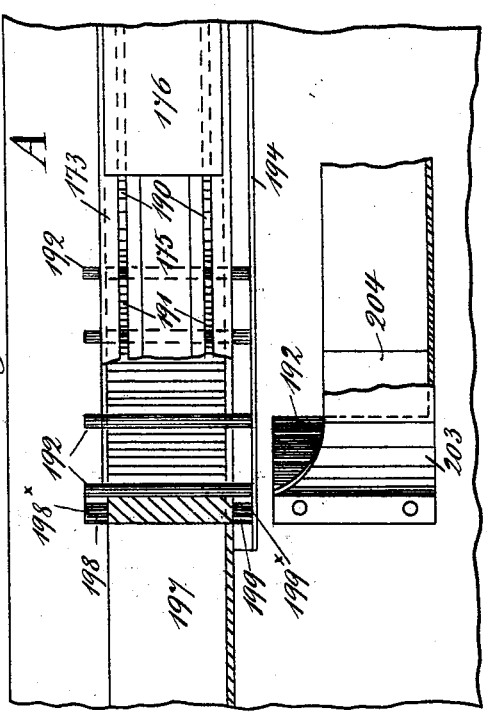
Witnesses.
Franz Mandl
Wilhelm Giesel
Inventor
Ernst Wentscher

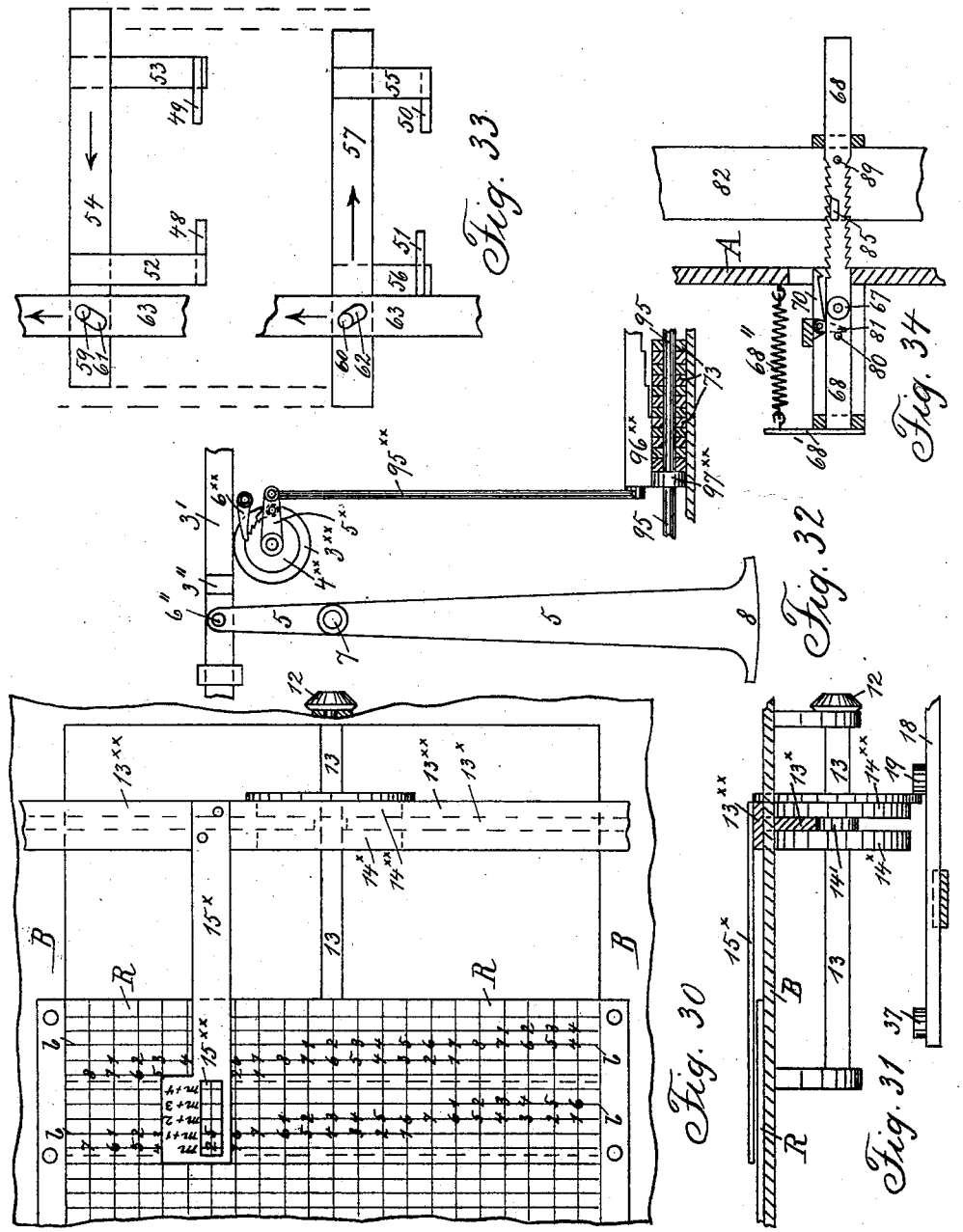

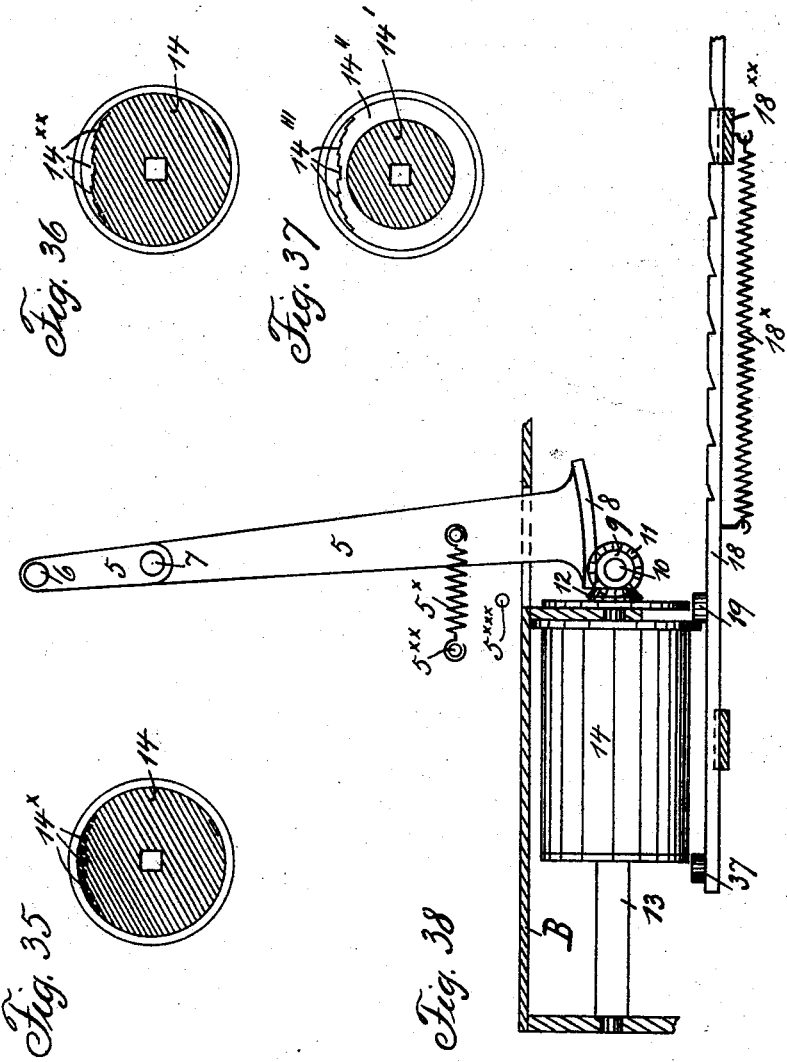

UNITED STATES PATENT OFFICE.

ERNST WENTSCHER, OF BERLIN, GERMANY.

JUSTIFYING DEVICE FOR TYPE-SETTING OR OTHER MACHINES.

SPECIFICATION forming part of Letters Patent No. 605,618, dated June 14, 1898.

Application filed March 13, 1895. Serial No. 542,259. (No model.) Patented in England March 6, 1895, No. 4,754.

*To all whom it may concern:*

Be it known that I, ERNST WENTSCHER, a subject of the German Emperor, residing at Berlin, Germany, have invented a new and useful Apparatus for Justifying Lines Composed by Type or Matrix Setting Machines, (for which I have obtained a patent in Great Britain, No. 4,754, bearing date March 6, 1895,) of which the following is a specification.

My invention relates to the apparatus for justifying lines in which spaces provisionally inserted by composing the line are changed afterward, so as to bring it to the required length; and the objects of my invention are, first, to provide an apparatus for justifying as well matrix-lines as those of common types; second, to justify by the same method and the same apparatus lines no matter whether previously set too short or too long; third, to dispense with the use of wedge-shaped or elastic or compressible spaces, as heretofore used in linotype-machines. I attain these objects by the apparatus described in this specification and illustrated in the accompanying drawings, in which—

Figure 1 is a front elevation of my apparatus applied to the well-known Mergenthaler linotype; Fig. 2, a plan view thereof, the covering frame-plate being partially broken away to clearly show the mechanisms beneath it; Fig. 3, a side and sectional view thereof on line $x\ x$ of Fig. 1; Fig. 4, a side and sectional view thereof on line $y\ y$ of Fig. 1; Fig. 5, a front view of the upper part of Fig. 4; Fig. 6, a sectional view on line $w\ w$ of Fig. 2; Figs. 7 and 8, a modification of a part of Fig. 1, front and side view, respectively; Figs. 9 and 10, a modification of another part of Fig. 1, front and top view, respectively; Fig. 11, a modification of Fig. 4, and Fig. 12 a section on line $z\ z$ of Fig. 11; Fig. 13, another modification of Fig. 4, and Fig. 14 a front view of a part of Fig. 13. Fig. 15 shows a register forming a part of my invention; Fig. 16, a side view of the left end of Figs. 1 and 2. Figs. 17, 18, 19, 20, 21, and 22 show several shapes of matrices and spaces forming a part of my invention. Fig. 23 is a front elevation of my apparatus applied to any setting-machine. Figs. 24 and 25 are top views of Fig. 23. Fig. 26 is a modification of Fig. 4 with reference to type-setting machines; Fig. 27, a top view of a part of Fig. 23 on an enlarged scale, and Fig. 28 a front view of Fig. 27. Fig. 29 shows another register. Figs. 30 and 31 are a plan view and a side view, respectively, of a register combined to an index to be moved over or along the register. Fig. 32 is a modification of the shifting device for the register. Figs. 33, 34, 35, 36, 37, and 38 are detail views of parts of my invention.

My invention consists in combining spaces of different sizes with a register showing in the form of written signs, indentures, holes, or projections at different places and of different depth or length both the number and the size of the spaces required to justify any line, the place of each indenture, hole, or projection determining the size of the space, and the depth or length of each indenture, hole, or projection controlling the number of each size required.

When setting a line, the register is shifted itself or another part is moved over or along the register in such manner that when the line has attained its provisional length the signs or marks of the register just showing the spaces required to justify this line are in sight, and the operator is thus enabled to insert by hand or by means of keys into the line the spaces shown by the register or in a position and condition susceptible of being brought into connection with a space-feeding mechanism, which thus is controlled by the marks of the register, so as to automatically insert afterward the required spaces, while the register or the part shifted along the same immediately returns to its normal position in order to be shifted by setting the next line, and so on.

The register, Figs. 15 and 29, is divided into sections V VI VII VII, corresponding to the number of words contained in a line, section V corresponding to a line of six words or five spacings, which is supposed to be the shortest line, and sections VI VII VIII to lines of six, seven, and eight spacings, respectively. At each insertion of a provisional space into the line being set up the register itself or the said other movable part or index is shifted along the register, Figs. 30 and 31, a distance of one section to bring the corresponding section into sight of the operator or into working position when the line has attained its provisional length. Another shifting movement is imparted to the register or to the movable index, which is independent of and, for instance, perpendicular to the first movement and corresponds to the increasing of the length of line by setting. This movement may begin at any period of setting the line. However, it is sufficient, and therefore preferable, to begin it but when the provisional line is near its end, the remainder of or the excess over the normal length coming only into consideration for justifying.

The sizes of the definitive spaces are multiples of a small unit, so that when indicating the thinnest space by $m$ units there are spaces of the respective thicknesses of $m$, $m+1$, $m+2$, $m+3$ units, or when departing from the middle space of $n$ units the spaces have the respective thicknesses of $n-3$, $n-2$, $n-1$, $n$, $n+1$, $n+2$, $n+3$ units.

When a provisional line is finished, the remainder of or the excess over the normal length will be a multiple of the said unit, or nearly so, up to a quantity practically insignificant if the unit in question is small enough, and these rests or excesses are obviously confined to comparatively narrow limits and yet corresponding to any line. It is therefore well practicable to calculate all these remainders or excesses and to register them, as shown in Fig. 15. This register is calculated on the supposition that the provisional lines may always be set too short and that the remainder of the normal length will not surpass thirty units, while the register represented in Fig. 29 corresponds to lines indifferently set too short or too long, the limits for the remainders and excesses being minus fifteen to plus fifteen units. These remainders or excesses are indicated by the left-hand numerals 0 to 30 in Fig. 15 and $-15$ to $+15$ in Fig. 29.

Referring now to Fig. 15, section VII, if, for instance, a provisional line of seven spacings leaves a remainder of thirteen units, section VII of the register shows the numerals 1 and 6 on the horizontal line 13 and on the vertical lines $m+1$ and $m+2$, respectively—that is to say, this line will be justified by changing the provisional spaces of the thickness of $m$ units to one definitive space of the thickness of $m+1$ and six spaces of the thickness of $m+2$ units.

If in another example a line of eight spacings leaves a remainder of three units, section VIII of the register shows the numerals 5 and 3 on the horizontal line 3 and the vertical lines $m$ and $m+1$—that is to say, the operator has to change three spaces of the thickness of $m$ units to three spaces of the thickness of $m+1$ units, and so on.

Likewise, referring to the register represented in Fig. 29, may a line of eight spacings have an excess of twelve units over the normal length. Then the horizontal line $+12$ of section VIII shows the numerals 4 and 4 on the vertical lines $n-1$ and $n-2$. The line will therefore be justified by changing four spaces of the thickness $n$ to four of the thickness $n-1$ and four to four of the thickness $n-2$.

Instead of changing the provisional spaces to the definitive ones they may be retained if constantly setting the lines too short, and additional spaces of the thicknesses of one, two, three, and four units, respectively, may be inserted afterward. To this case correspond sections V VI of the register represented in Fig. 15, which will be understood without further explanation.

It is obvious that the register can be made and calculated for less than five spacings if the length of lines is short and the lines have less than five spacings and for more than eight spacings. However, although lines have commonly more than eight spacings and a limit in this direction cannot be fixed, there is no practical reason to increase the number of sections, because lines showing more than eight spacings can be justified in the same manner as lines with eight spacings, the remainder of or the excess over the normal length being distributed among eight spacings only and the other spaces not being changed. If, therefore, by setting a line of more than eight spacings section VIII of the register is brought into sight of the operator or into working condition, the sectional shifting movement of the register is stopped.

If the justifying shall be performed automatically, the register must be provided with marks susceptible of mechanical action, as indentures, holes, projections, and so on. For this purpose I prefer holes arranged at different places corresponding to the intersections of the said horizontal and vertical lines $a\,b$ of the registers, Figs. 15 and 29, these holes being of different depth, corresponding to the numerals of the registers described heretofore—that is to say, to the number of the spaces required. The numerals annexed to the holes $c$ of the sections V VIII, Fig. 15, and sections V VIII, Fig. 29, therefore indicate as well the number of the spaces required as the depth of each hole. A further explanation of these sections is not deemed necessary.

When a provisional line is finished, the section of the register or drum corresponding to the number of spaces in a line and the row of holes corresponding to the remainder or excess of this line are in working condition, and then this part of the register is brought into connection with a feeding mechanism. The latter is thus controlled in a twofold manner, corresponding to the place of the register-holes and to their depth. The place of the holes controls the size of the spaces to be afterward inserted, and the depth determines the number of each size. The feeding mechanism having been controlled, (which is performed in a very short time,) the register returns to its normal or initial position, while the operator begins a fresh line.

My process of justifying lines is indifferently applicable to any lines composed by setting-machines, no matter whether the elements to be composed are types, as employed in common type-setting machines, or matrices, as in line-casting machines, or male dies, as in matrix-making machines. Likewise the apparatus for carrying out my process shows the same features when applied to any setting-machine, as its construction and working are quite independent of the special feature of the setting-machine, my apparatus simply consisting in the combination of the above-described register, of means for setting this register at the end of a line, and of means for controlling the space-feeding mechanism by the set register.

In order to clearly show the adaptability of my apparatus to any setting-machine, I have represented the same in the drawings, first, combined to a matrix-setting and line-casting machine of the well-known Mergenthaler-machine type; second, to a setting-machine, which is supposed to compose as well common types as matrices or male dies. I am presently describing my apparatus in the first combination and modifications thereof, Figs. 1 to 22.

Opposite to the assembling-receptacle 1 of the matrices I provide a block 4 on a movable rod 3, guided in supports of the frame A, which block is reached by the foremost matrix when the provisional line is near to be finished and then taken along within the measure as the length of the line increases until all matrices forming the line are assembled, a provisional space being inserted between each two words. The movement of the block 4 is transferred to a drum 14 by a toothed lever 5, engaging at one end with a forked piece 3*, placed on rod 3, and at the toothed end 8 with a pinion 9 on a shaft 10, and then by bevel-wheels 11 12 to the square shaft 13 of the drum 14, longitudinally movable on its shaft and containing on its surface the register-holes.

Fig. 35 represents drum 14 in cross-section, taken on a row of holes 14$^\times$ and showing the different depths of the holes. This row of holes corresponds to the vertical line designated by +2 of section V of the register of Fig. 15. A modification of the drum 14, containing stepped indentures 14$^{\times\times}$ instead of holes, is shown in Fig. 36 in similar section, and another modification in Fig. 37. In the latter the drum-body 14' is reduced in diameter and carries on its surface rings 14", with steps 14''' projecting at different lengths from the drum-surface.

Instead of directly actuating lever 5 by the increasing line there may be provided a piece which is successively shifted by each key-stroke a distance corresponding to the thickness of the released matrix, and this piece may reach at a convenient time lever 5 and rod 3 and take them along, as will be hereinafter described with reference to Fig. 32.

A two-armed lever 16, reaching beneath the spacing-key 15, which is depressed after each word to insert a provisional space and carrying a pawl 17 at its other arm, engages with a ratchet-rack 18. This latter is thus shifted at each stroke of the key 15 and takes along with it the drum 14 as soon as roller 19 of rack 18 reaches the projecting drum edge—that is to say, in accordance with the foregoing, at the sixth stroke of key 15 in setting a line. Thus the provisional line of matrices being finished, the holes of the drum controlling the spaces for this line are in working condition—namely, underneath a series of pins or fingers 27, guided vertically in holes 27* of the frame-plate B and in a guide-plate 28. Fingers 27 are loosely connected to levers 26, held in a raised position by a cross-bar 25, forming with its arms 25* a swinging frame on shaft 24. The holes 27* of the frame-plate and the fingers 27 correspond to the holes of the drum, and the fingers fit and may enter into the register-holes when the cross-bar 25 and levers 25* descend.

A crank-shaft 22 is provided underneath the frame-plate B, carrying a crank 20 at its outer end and a series of cam-disks 30 43 21 34 40. Cam-disk 30 actuates a rod 31, bearing with a roller against the edge of the cam-disk and pivoted to the assembling-receptacle 1, turning on a pivot 29 of the frame. The edge of cam-disk 30 is so shaped that when turning the crank-shaft rod 31 first descends and receptacle 1 swings down by gravity, and then rod 31 and receptacle 1 are raised again to the normal position shown, Fig. 1. Against the cam-disk 43 bears a two-armed lever 44 45, reaching with its upper end the downward-extending arm 46 of a plate 2, which is kept in constant oscillation by the reciprocating piece 2* to forward the matrices descending into the assembling-receptacle.

Cam-disk 21 controls the movement of a lever 23, mounted on the shaft 24 of the swinging frame 25 25*.

On the cam-disk 34 rests an arm 35 of a pawl 33, engaging with the ratchet-rack 18, together with pawl 17. The latter has a lateral projection 36 extending over pawl 33 and is brought out of engagement with the rack 18 together with pawl 33. A cam-disk 40 finally actuates a lever 42, mounted on a shaft 41, carrying at its other end a pawl 38, engaging with the ratchet-wheel 39, fixed to the drum-shaft.

The cams of the disks on shaft 22 are shaped and disposed in such manner that if the crank 20 is turned once around first the oscillating plate 2 is pressed against the rear end of the assembling-receptacle 1 to bear against a bridge 47, as indicated by dotted lines, Fig. 1, in order to form a true rest for the line of matrices thus being clamped between the plate 2 and the block 4 and to bring the latter, and consequently the register-drum, into an exact position. Then the cam of disk 21 strikes the lever 23 and swinging frame 25

25* descends, followed by those of the levers 26, the fingers 27 of which correspond to a hole of the drum-section just in working condition, whereon all these parts immediately return to their normal position. After that the other cams come into working position, the assembling-receptacle 1 swings downward, as indicated by dotted lines, Fig. 1, to deliver the matrices to the inclined channel 32 and then back upward into its normal position, oscillating plate 2 is released by lever 45, and pawls 33, 17, and 38 are thrown out of engagement with rack 18 and ratchet-wheel 39, respectively, whereby rack 18 is driven back by a spring or weight taking along with the drum by roller 37, and the drum is simultaneously turned back by a weight or spring, so as to come into its normal and initial position.

The means for returning rack 18 and drum 14 to their normal position are shown in Fig. 38, corresponding to Fig. 1, and consists of a spring $18^\times$ connected at one end to the rack and at the other end to the fixed guide-piece $18^{\times\times}$ of the rack, and of a spring $5^\times$, fixed at one end to lever 5 and at the other to a pin $5^{\times\times}$ of the frame work. As the drum is released from pawl 38 spring $5^\times$ draws lever 5 to the left and takes along with the drum by means of the connecting parts 8 9 10 11 12 until the lever is stopped by a fixed pin $5^{\times\times\times}$ and the drum thus returned to its normal position. The working is obviously the same, if for springs $18^\times$ and $5^\times$ there are substituted cords or chains passing over pulleys and carrying weights at their free ends. Pawls 17, 33, and 38 then engage again with rack 18 and wheel 39, respectively, while the operator begins to set a fresh line.

The assembling-receptacle 1 and the inclined channel 32 have similar cross-sections, as shown, Fig. 3, and the matrices, Figs. 17, 18, and 22, are supposed to be of the form of the linotype-matrices, so as to be suspended by their upper projections in the lateral grooves of the assembling-receptacle 1 and the inclined channel 32, in which they descend by gravity to the space-feeding mechanism and then to the casting device.

The space-feeding mechanism, Figs. 1, 2, 4, 5, and 6, consists of a series of ratchet-racks 68, horizontally guided and passing with their front ends between the channels 82, which contain the spaces, each channel one size in an order corresponding to the vertical lines b of the register.

The spaces are of the form shown, Figs. 19 and 20, without lateral projections at the under side and stand over one another in the channels 82, as represented, Fig. 4. Between the channels 82 are mounted on an axis 92 two-armed levers 92*, with lateral projections 93 94, which latter enter into the channels, forming the well-known escapement for releasing but one matrix at each oscillation. Levers 86 are pivoted to the channels 82, entering with lateral projections 87 into the same and resting on pins 89 of the racks 68, which likewise enter into the channels with lateral projections 85. With reference to Fig. 5, each rack 68 belongs to the left-hand adjacent channel 82 and enters this channel with a left-side projection 85, Fig. 4, supporting the undermost space in the channel, and each catch-lever 86 belongs to the right-hand adjacent channel 82, and enters this channel with a right-side projection 87, while each lever 86 rests on the pin 89 of the left-hand adjacent rack 68. To each channel belongs one of the racks 68 and one of the levers 92*; but there is wanting one lever 86 to the first channel. The racks 68 are held in their represented normal position by springs 68″, Fig. 34, fixed at one side to the frame A and at the other to arms 68′, provided at the rear ends of the racks, and the levers 86 are pressed against the pins 89 by springs 90, and thus kept out of engagement with the undermost space if the racks are in their normal position; but if a rack 68 is drawn back the right-hand adjacent lever 86 catches the foot of the space in the right-hand adjacent channel 82 and prevents it from dropping down, even though it is released by the projection 94 of its lever 92*. Likewise the undermost space is retained in the channel by the projection 85 of its rack 68 in its normal position no matter whether the projection 94 of the corresponding lever 92* is within or without engagement with the upper projection of the space.

The racks 68 are toothed at both edges in order to allow of a step-by-step return movement to their normal position when removed therefrom and controlled by the well-known type-writer escapement, consisting of a fixed pawl 79 and a swinging pawl 72. The fixed pawl 79 is common to all racks and is formed of a cross-bar connected to reciprocating rods 63, pivoted at their lower ends to levers 95* on a shaft 95 and at their upper ends to levers 91, mounted on shaft 92. A shaft 75, extending between the rods 63, carries levers 71, loosely mounted thereon and pivoted at 74 to the pawls 72. Springs 77 on a cross-bar 76 actuate the levers 71 and the pawls 72. From that it will be understood that by reciprocating the frame 63 79 75 the racks 68 will perform a step-by-step movement to reach their normal position after having been drawn back, provided that they are not stopped by the retaining-pawls 70. (Shown in Fig. 4.)

Pawls 70 are provided in connection with the racks 68, resting with arms 81 against pins 80 of the racks, so as to be out of engagement with the teeth of the racks if the latter are in their normal position; but if a rack is drawn back the corresponding pawl 70 engages with the teeth of a rack. To each rack 68 corresponds one of pawls 70; but there is one pawl wanting to the first rack, and the pawl engaging with the second rack is controlled by the pin 80 of the first rack, that engaging with the third rack by the pin of the second rack, and so on.

Two-armed levers 65, actuated by springs 69, bear against rollers 67 of the racks 68 and are connected by the other arms and rods 66 to the above-mentioned levers 26, engaging with the fingers 27. If, therefore, the register at the end of a provisional line is brought into its working condition and when the fingers 27 descend, by turning the crank 20 the rear ends of levers 26 will be raised and the racks 68 drawn back a distance corresponding to the depth of the register-holes—that is to say, a rack 68, drawn back by entering of the corresponding finger into a hole of the depth 5, will return in five steps to its normal position, and so on, provided that it will be released by its pawl 70. This may be illustrated by the following examples: Suppose, first, that the first—i. e., the outmost left-hand—rack of Fig. 5 may have been drawn back. The undermost space in the first channel 82 is then released by the projection 85 of the rack, and as no catch-lever 86 is provided to this channel, as stated heretofore, the space is retained only by the projection 94 of the escapement-lever 92*. The rack is stopped only by the corresponding escape-pawl 72, no retaining-pawl 70 being provided for this rack, as stated heretofore. Suppose, second, that another rack 68, say the second rack, may have been drawn back. The undermost space in the second channel 82 is then released by the projection 85 and in accordance with the foregoing likewise released by the left-hand adjacent catch-lever 86, as the first rack 68 is in its normal position and bears with its pin 89 against the said lever, so as to hold it in an unlocking condition. The space is therefore retained only by the corresponding lever 92*. The rack itself is not caught by its pawl 70, for the left-hand adjacent rack, being in its normal position, bears with its pin 80 against the arm 81 of that pawl and keeps it out of engagement with the rack. The latter is therefore stopped only by the escapement-pawl 72. The same conditions take place for any single rack which has been drawn back; but the registers, Figs. 15 and 29, show that each spacing is generally controlled by two holes lying close by each other. Correspondingly there will be generally actuated two racks 68 in the feeding mechanism, also lying close by each other. Suppose, therefore, generally, that any two adjacent racks 68, say the third and the fourth rack, may have been drawn back. The undermost space in the third channel will then be released by the projection 85 of the third rack and likewise by its catch-lever 87, as the second rack, being in its normal position, keeps this lever out of its locking position. The space is therefore retained only by its escapement-lever 92*. The third rack itself is stopped only by its escapement-pawl 72, as its catch-pawl 70 is held out of engagement by the second rack 68 being in its normal position and bearing with its pin 80 against the arm 81 of that pawl. The undermost space in the fourth channel 82 will be released by the projection 85 of the fourth rack 68, but caught by its spring-actuated catch-lever 86, as the third rack, which controls this lever, has been drawn back, as supposed, and does not bear with its pin 89 against the same. This space will therefore be locked until the third rack 68 returns to its normal position, even though in the meanwhile the escapement-lever 92* of the fourth channel should release the space. The fourth rack 68 itself is caught in its rearward position as well by the escapement-pawl 72 as by its catch-pawl 70, the third rack having likewise been drawn back, as supposed, and therefore not bearing with its pin 80 against the lever-arm 81 of that catch-pawl 70, which in consequence thereof is in engagement with the fourth rack 68. This rack will therefore be caught until the third rack reaches its normal position, even though in the meanwhile the escapement-pawl 79 should release that rack.

Levers 95* are mounted on a shaft 95, which extends to the keyboard of the setting-machine and passes through the hollow axis of the keys 73. A swinging frame, consisting of a cross-bar 96*, which extends above all keys, and arms 97*, mounted on shaft 95, is held in its lowered position by springs and raises at each key-stroke. Therefore, the feeding mechanism having been controlled at the end of a line, by turning the crank the escapement, consisting of the pawls 72 79, will be reciprocated when the operator is setting the fresh line, and the racks 68, drawn back by the previous crank movement, will then return by a step-and-step movement to their normal position; but from the foregoing it will be clear that by reason of the pawls 70 the racks 68 cannot perform this movement but each after one another, and that at each step a space will drop down out of but one channel, (if there was but one controlling-hole of the register in action,) or commonly out of two adjacent channels successively until the controlled number of spaces is reached and the feeding stopped by entering of the projections 85 of the racks 68 into their channels to catch the undermost spaces.

The dropping spaces are inserted into the line at their proper places as follows: Two slide-bars 54 57, Figs. 1, 2, 6, and 33, placed over one another and guided horizontally in the frame, and a support 58, fixed to the inclined channel 32, engage with pins 59 60 to oblique slots 61 62 of one of the rods 63, so that the slide-bars 54 57 are alternately reciprocated in opposite directions when the rod performs its reciprocating movement. Fig. 33 shows the single slide-bars 54 and 57 detached from but in relative position to each other as concerning their longitudinal shifting movement. The upper slide-bar 54 is provided with lateral downwardly-extending arms 52 53, arm 52 being fixed to one side of bar 54 and arm 53 to the other, and likewise the lower slide-bar 57 with arms 55 56. To the arms 52 53 55 56 are fixed projections or teeth 48 49 50 51, and openings are provided in the sides of the inclined channel 32 opposite to the teeth, so that the latter may alternately enter into the grooves of the channel. Each letter-matrix is notched at its upper projections, as indicated by numeral 64, Fig. 17, while the provisional spaces, Fig. 18, have full upper projections, and the definitive spaces, Fig. 19, are wanting of the lower projections, so as to enter into the inclined channel 32 when dropping down out of their channels 82, the upper edges of the grooves of channel 32 being notched at 83, Fig. 1, beneath channels 82 for this purpose in order to allow of the passage of the upper projections of the matrices into the grooves of channel 32. Thus the definitive spaces when dropping down are suspended by their upper projections in the grooves of channel 32 and driven downward by gravity, as well as the letter-matrices.

The letter-matrices, Fig. 17, will pass by the escapement formed of the teeth 48 49 50 51, no matter whether the teeth enter into the grooves of channel 32 or not; but the provisional spaces, Fig. 18, will be retained by the teeth 48 50 or the teeth 49 51. By these means the provisional line of matrices passing from the assembling-receptacle 1 to the inclined channel 32, as described, when driven downward by gravity, is stopped at the first provisional space and but the first word descends to the end of the inclined channel 32.

When beginning the fresh line, rod 63 performs a reciprocating movement at each key-stroke, and teeth 48 50 and 49 51 of the escapement come alternately into engagement with the grooves of channel 32. From that it will be understood that there will be separated step by step one word after another from the line and descend to the end of the channel; but simultaneously there drops a definitive space into the channel at each stroke, as stated before. The line will therefore reach the end of channel 32 with the definitive spaces inserted at their proper places—that is to say, in a justified condition. The provisional spaces remaining in the line, it is obvious that the justifying-spaces in the channels 82 are respectively of the thicknesses of one, two, and three units, as described with reference to sections V VI of the register represented in Fig. 15.

In order to increase the weight of the thinnest spaces of one and two units and to insure their descending movement in the channels 82, they may be provided with a heavy lateral projection 115, as represented, Fig. 20, and channels 82 with corresponding grooves for the passage of projections 115. These latter are placed and disposed so as to not interfere with the letter-matrices nor with the casting device.

If the provisional spaces shall be withdrawn and substituted by definitive spaces of the thicknesses of $m$, $m+1$, $m+2$ or $n-2$, $n-1$, $n$, $n+1$, $n+2$ units, letters $m$ and $n$ indicating, respectively, the thickness of the thinnest or of a middle space, as described with reference to sections VII VIII and V VIII of the registers represented in Figs. 15 and 29, and the escapement for detaching single words from the line in order to insert the definitive spaces has the arrangement shown in Figs. 7 and 8 in front view and side view, respectively, and the provisional spaces in this case have no triangular recess at the upper edge, Fig. 21, as the letter-matrices, Figs. 18 and 22. An indenture 121 is provided near the upper edge to engage with a spring-hook 119, Figs. 7 and 8, in order to draw upward the space and out of the line. The hook 119 is attached to a slide-piece 118, guided vertically on a channel 117, into which enter the provisional spaces when removed. A triangular projection 116, extending downward from the channel 117 into the inclined channel 32, prevents the provisional spaces from passing by that projection, while the letter-matrices, by reason of their triangular recess, Fig. 18, are enabled to slide downward to the end of channel 32. Another stop 116* may be provided and the letter-matrices made with a corresponding recess at the foot, Fig. 22.

Slide-piece 118 is reciprocated by a lever 120, connected to one of the above-mentioned rods 63. Therefore at each key-stroke by setting a fresh line a provisional space will be withdrawn out of the previously-set line, sliding step by step toward the projection 116 or projections 116 and 116* and then descending word by word to the casting device at the end of channel 32; but at each key-stroke there will also drop a definitive space out of channels 82 into the channel 32, as stated before. The line will therefore reach the end of channel 32 in a justified condition, the provisional spaces being changed against definitive ones.

The spaces withdrawn by the hook 119 enter into channel 117, passing with their upper edge between constantly-rotating friction-rollers 122 123, pressed against each other by springs, and are carried upward by friction, thus raised step by step to the upper part of channel 117. A spring 124, entering into the channel opposite to an aperture 125 in its side, bears against the uppermost space of the ascending column of spaces and presses it out of the channel through aperture 125, while the upper lateral projections of the space enter into grooves of the inclined channel 126 to keep it suspended when descending by gravity to the projections 127, provided at the end of channel 126. Thus the provisional spaces are assembled again in the lower part of channel 126 and may be detached each after another and drop down through channel 128 in order to be inserted at their proper places into the fresh line being composed.

Figs. 9 and 10 show in front view and top view, respectively, a modification of assembling the matrices and controlling the register. The matrices detached by the key-stroke are supposed to enter at the upper end of channel 129 and to descend by gravity until they are arrested by the block 4, fixed to a lever 131, pivoting on a pin of rod 130, which latter is guided in the frame of the machine and engages with the toothed lever 5, controlling the register-drum. Lever 131 is connected by a rod 135 to a lever 134 on a pivot fixed to the frame, and a cam-disk 132, mounted on the crank-shaft 22, actuates the lever 134 by means of a rod 133 and a roller bearing against the edge of disk 132. Another cam-disk 137 actuates the swinging plate 136 by means of a rod 138.

When turning the crank at the end of a provisional line, this line is first clamped between plate 136, which swings into the position represented by dotted lines, and between block 4, which latter at the same time is driven forward a distance corresponding to the remainder of or the excess over the normal length of the lines, and the register-drum is accordingly turned into its working position. By further turning crank-shaft 22 the projecting edge portion of cam-disk 132 passes under the roller of rod 33, whereby the latter is drawn downward and block 4 therefore swung upward, releasing the line, which then descends by gravity toward the space-feeding apparatus.

Figs. 11, 12, 13, and 14 show modifications of the space-feeding escapement. In the modification represented in Fig. 11, side view, and Fig. 12, vertical section through line z z of Fig. 11, ratchet-wheels 139 are loosely mounted on an axis 139*, supported by bearings 140*. Levers 92*, with projections 93 94, as heretofore described with reference to Fig. 4, loosely mounted on an axis supported by the space-containing channels 82 and kept by springs in their represented normal position, engage with the wheels 139 by rear projections 157. To each ratchet-wheel 139 belongs one lever 142 and one of a series of ratchet-segments 141, both loosely mounted on boxes 141*, fixed to the wheels 139. Segments 141 are provided with arms 140, carrying each a pawl 145, which engages with the ratchet-wheel 139, and a pin 143, bearing against lever 142. Segments 141 are kept by springs in their represented normal position and return thereto when removed therefrom. Ratchet-wheels 139 move freely on axis 139*. Pins 154 of the segments 141 engage with rods 153, which enter with their front ends into the channels 82 to catch the undermost spaces, as shown in Fig. 11, and hold the pawls 155 out of engagement with the segments 141, pawls 155 bearing with arms 156* against pins 156 of rods 153 and being disposed in the same manner as described with reference to pawls 70 of Fig. 4; but if the segments are turned out of their normal position rods 153 spring back, so as to release the undermost space and allow of engagement of pawls 155 with the segments.

Swinging plates 147 are loosely mounted on an axis 146, extending between the bearings 140*, and carry each two pawls 148 149 on a box 146*, pawl 149 being longitudinally guided by the box, and a pin of plate 147 engaging with slots 150 151 of the pawls, and pawl 148 pivoting on boxing 146* of the plate. The pawls are actuated by springs.

Levers 142 are connected by rods 144 to the above-mentioned levers 26, which engage with the fingers 27, controlled by the register, and plates 147 are connected by rods 152 to levers 95* on the above-mentioned shaft 95, which extends to the keyboard throughout the hollow axis of the keys and carries the swinging frame 96* 97*. If, therefore, segments 141 are turned out of their normal position when turning the crank and controlling the levers 26 by the register, they will return thereto in a step-by-step movement when composing the next line, and a space will be fed out of the channels 82 at each step.

The modification represented in Fig. 13, side view, and Fig. 14, front view, channels 82 being removed, is based on the principle of the well-known numbering-machines. On a shaft 167, supported by bearings 167*, are loosely mounted ratchet-segments 159, kept in position by spring-pawls 165. To each segment belongs a lever 163, likewise loosely mounted on shaft 167 and bearing against a pin 164 of the segment when the latter is in its normal position, as represented in Fig. 13. A stepped pawl 158 extends between the two-armed levers 166, fixed to the ends of shaft 167, passing throughout the hollow axis of the segments. Pawl 158 is mounted on a shaft 161, journaled in the levers 166 and extending through one of these levers. A lever 160 is fixed to the projecting end of shaft 161 and bears with a pin against a stop 162, supported by the channels 82, when pawl 158 is out of engagement with the ratchet-segments 159. Pins 168, projecting downward from segments 159, bear against studs 169* of rods 169, guided between the channels 82 and entering each, with lateral projections 170 171, into two adjacent channels. Rods 169 are actuated by springs, and the projections 170 171 are placed to both sides of the rods and at such distance from each other that projection 170 catches the undermost space of one channel, and projection 171 at the same time releases the undermost space of the adjacent channel, when rod 169 is kept by the pin 168; but if a segment 159 is turned out of its normal position rod 169 springs back and projections 170 171 change their functions. Levers 163 are connected by rods 163* to the levers 26, controlled by the register, and levers 166 by the rods 63 to the levers 95* of the shaft 95, carrying the swinging frame 96* 97*. To rods 63 are likewise connected levers 91, journaled in the rear wall of channels 82 and carrying the escapement-levers 92*, which enter into the channels with projections 93 94, for the purpose heretofore described.

From the foregoing description it will be clear that when the segments 159 are brought out of their normal position by turning the crank and controlling the levers 26 by the register, and then the keys are depressed by composing the next line, pawl 158 will be oscillated and the segments turned back step by step and one after another to their normal position, while at the same time a space is fed at each stroke.

The casting device is represented in Figs. 1, 2, and 16 in front view, top view, and side elevation, respectively. The justified line of matrices, when descending word by word in the channel 32, reaches finally a receptacle 112, forming the continuation of channel 32 and supported by a lever 114, pivoted at 113 to the frame of the machine. The line bears against a cross-plate 104, fixed to the frame-plates and normally inclined to the direction of channel 32, so as to likewise incline the assembled matrices as required for casting. Clamps 96 97, turning on pivots 98 99 in bearings of the frame and controlled by cams 102, actuating the roller-arms 100 101 of the clamps, extend to both sides of the matrix-line.

A two-armed lever 105, actuated by a cam-disk 106 on shaft 106*, is mounted on a shaft 105*, journaled in the frame-plates. To lever 105 is pivoted another lever 103, carrying a block 103* and actuated by a two-armed lever 108, loosely mounted on shaft 105* and bearing against a cam-disk 109. Lever 103 is controlled by a spring 107, which swings upward the block 103*, so as to bring it into line with the matrices behind the outermost matrix, when the corresponding portion of cam-disk 109 passes by the roller of lever 108, so as to release lever 103 from the pressure of lever 108. The several cams are disposed and shaped in such manner that by a revolution of their supporting-shaft 106* first block 103* is raised and then carried toward the line in order to slightly compress it in the length, while the clamps 96 97 are pressed against its sides to straighten the line in its slightly-compressed condition. After that the line is released again from the clamps and block 103* driven forward to firmly compress the line, and then clamps 96 97 are firmly pressed again to its sides. The line being in this condition, the spout 111 of the melting-pot is swung toward the mold 110, provided in clamp 97, and the casting performed. Then all parts return to their normal position, while the receptacle 112, with the matrices, is carried upward by lever 114 to the distributing apparatus.

Figs. 23 to 28 show my invention applied to any setting-machine. The types—that is to say, common types, matrices, or male dies, so far as the construction and the working of my apparatus are absolutely independent of the kind of types or elements to be composed—released by the key-stroke enter at 172 into the type-channel 173 and are pushed forward by the oscillating plate 2, actuated by the reciprocating pusher 174. A spring-catch 189, Fig. 24, fixed to a part 177, hereinafter described, and entering through a slot into the channel, prevents the types from falling back. Provisional spaces consisting of wire pieces 192, Figs. 27 and 28, of greater length than the types and of smaller diameter than the body of the latter, are inserted after each word. The spaces project from the line at the top and at the bottom and are guided in the middle of the line by guide-rails 195 196, fixed to the upper edges of the channel 173, and by a slot 193 in its bottom. A strip 194, extending beneath slot 193, prevents the spaces from dropping down. Block 4, plate 2, rod 130, toothed lever 5, levers 131 134, rods 133 138, and cam-disks on the crank-shaft 22 perform the same functions as described with reference to Fig. 9.

Two levers 180 181, on pivots 180* 181* of the frame of the machine and slotted at their upper end, engage with slide-pieces 176 177, guided in lateral grooves 175 of the sides of the type-channel 173. Lever 181 is actuated by a cam-disk 184 on the crank-shaft 22 against spring 183 and engages by its hook-shaped arm 185 with a stud 186 of the arm 187 of lever 180, controlled by a spring 182. Slide-pieces 176 177 are provided with spring-pawls 190 189, entering into the type-channel through slots 191 of its side walls. By turning the crank when a provisional line is finished the line is clamped between plate 2 and block 4 in order to control the position of the register, and block 4 swings upward, all as heretofore described, and then levers 180 181 are put into swinging motion by cam-disk 184. Lever 181 swings from the right to the left of Fig. 23, forwarding the set line by pawls 189 of slide-piece 177, while lever 180, simultaneously swung from the left to the right, brings the spring-pawls 190 of slide-piece 176 at the end of the forwarded line to bear against the outermost type. If then by carrying on the crank movement lever 181 swings back to the right into its normal position, the line is forwarded again by lever 180 likewise returning to its normal position, which latter, however, is not reached by the lever 180, the line being stopped at the foremost space, which is retained by bridges 198 199 of the galley 197, Figs. 27 and 28.

The space-feeding mechanism, Fig. 26, is nearly the same as represented in Fig. 4, the parts indicated by similar numerals performing similar functions, as described with reference to Fig. 4, so that another description of the same is deemed superfluous. The definitive spaces 205 are placed in horizontal channels 206, turning their flat sides to the walls and pressed by a spring or weight and a piece 207 against the closed ends of the channels. Each channel is provided with an aperture beneath the foremost space and a drop-shaft 212, through which the space drops down when released to the common inclined channel 213, and then descends by gravity to its lower end and opposite to a pusher 214, Fig. 27, in order to be pushed into the line through an aperture 215 of the rear wall of channel 173. Shaft 92, which is connected by levers 91 to the swinging frame 63, carrying the fixed pawl 79 and the loose pawls 72, as and to the purposes described with reference to Fig. 4, is provided with levers 216, and at one end with a lever 221, connected to the pusher-rod 221*. Levers 216 engage each with studs 217 of rods 209, vertically guided between the channels 206 and carrying a lateral projection 211 on an arm 210, extending from the rods. Channels 206 are provided with lateral recesses beneath the projections 211, so as to allow of entering of the latter and driving downward the outermost space, when a rod descends by pressure of a spring 208. Rods 209 are indented at 220, and pawls 218, pressed by springs against rods 209, will enter into the recesses 220 and catch the rods in their raised position if the ratchet-racks 68 are drawn back and the lower arms of pawls 218 released from studs 219 of the racks. Pawls 218 and pawls 70, engaging with racks 68, are disposed as and to the purpose described with reference to Fig. 4—that is to say, the first pawls 70 and 218 are controlled by the first racks 68 and engage with the second rack 68 and with the second rod 209, respectively, and the second pawls 70 218, controlled by the second rack, engage with the third rack and rod, respectively, and so on. Rods 209 finally are caught by the front ends of racks 68 if the latter are in their normal position, as represented in Fig. 26.

From the foregoing it will be understood that racks 68 having been drawn back when controlling the levers 26 by the register, and then shaft 95 being oscillated by setting a fresh line, racks 68 will be brought step by step and one after another to their normal position, and one space will be fed at each step and driven forward into the type-channel by the reciprocating pusher 214, while the provisional space 192, removed by the entering definitive one, drops down through an aperture 202, Fig. 27, into a channel 203 and is pushed forward at the next stroke by a projection 204*, Fig. 26, extending downward from pusher 214. Thus the line of provisional spaces assembled in the channel 203 and resting upon a slide-piece 204 is forwarded step by step toward that end of channels 203 and 173 where the provision type-line is composed and the provisional spaces are inserted again.

As soon as a provisional space has been substituted by a definitive one lever 180 comes into action and pushes forward the type-line until it is stopped again by the next of the provisional spaces, which is caught by the bridges 198, 199, and so on.

The latter are loosely mounted on pins and bear against studs 198* 199*, and the pusher 214 is cam-shaped at 214*. Thus when the pusher is forwarded cam 214* actuates the rollers of the bridge-arms, and the line up to the provisional space bearing against the bridges is slightly pressed back, whereby the breach between the words formed by a provisional space is enlarged in order to allow of the insertion at a larger-sized definitive space. All the provisional spaces having been thrown out and changed against definitive ones, the line when supposed to consist of common types reaches the galley 197 in a justified condition and is shifted sideward by the reciprocating piece 200 to make way for the next line, a movable wall 201 of the galley being provided to bear against the column.

It will be obvious that the galley represented, Figs. 23, 24, 27, and 28, is to be changed against a casting or an impression apparatus if the elements composed are matrices or male dies, respectively.

Figs. 30 and 31 show in top view and in front view, respectively, a modification, alluded to heretofore, for selecting the spaces required to justify a line by an index movable over or along a register provided with written signs, the register itself being stationary. The register R is fixed to the frame-plate B, and an index $15^\times$ is connected to a longitudinally and laterally movable rod $13^{\times\times}$. The index is slotted at $15^{\times\times}$, and as rod $13^{\times\times}$ is controlled at the end of a provisional line the index is accordingly set and slot $15^{\times\times}$ brought over that part of the register which contains the denomination of the size and number of the spaces required. The number of the latter is indicated by the written numerals, and the size of each number of spaces depends on the vertical lines $b$ occupied by the several numerals, as heretofore fully explained with reference to the registers represented, Figs. 15 and 29. In the present instance the denomination of the several sizes, as $m$, $m+1$, $m+2$, $m+3$, $m+4$, instead of being written at the head of lines $b$, as shown, Figs. 15 and 29, is preferably set on an enlarged portion of the index extending along the slot $15^{\times\times}$, so as to coincide with the respective lines $b$. In the position of the index represented, Fig. 30, the operator will therefore read at a glance that the line in question is to be justified with two spaces of the size $m$ and with five spaces of the size $m+1$. He will therefore select these spaces among the space-magazine and substitute the same for the provisional spaces, either by hand or by means of a keyboard apparatus. Rod $13^{\times\times}$ is provided at its under side with two rows of teeth engaging with two gear-wheels $14^\times$ $14^{\times\times}$, connected by a box 14', which, together with the said wheels, is longitudinally movable on the square shaft 13 without turning on the same. A guide-rod $13^\times$, extending the whole length of rod $13^{\times\times}$ and fixed thereto in the middle part, fits in the space between wheels $14^\times$ $14^{\times\times}$. The means for turning shaft 13 and shifting wheels $14^\times$ $14^{\times\times}$ along the shaft are the same as described with reference to the register-drum 14, Figs. 1, 2, and 3, and are indicated by similar numerals, so that a further description is not deemed necessary.

Fig. 32 represents the modification alluded to heretofore, in which instead of directly actuating lever 5 by the increasing line there may be provided a piece successively shifted by each key-stroke a distance corresponding to the thickness of the released type, and this space may reach at a convenient time lever 5 or rod 3 and take them along with. To this purpose a swinging frame $96^{\times\times}$ $97^{\times\times}$ of similar construction as described with reference to frame $96^{\times}$ $79^{\times}$, Figs. 1, 2, and 3, is connected to the keys 73 of the keyboard. The cross-bar $96^{\times\times}$ of this frame is stepped, as shown, so as to perform at each key-stroke a swinging movement corresponding to the thickness of the type released by that stroke. A rod $95^{\times\times}$ connects the frame to a ratchet device $4^{\times\times}$ $5^{\times\times}$ $6^{\times\times}$, ratchet-wheel $4^{\times\times}$ thus being accordingly shifted at each stroke. A toothed wheel $3^{\times*}$, mounted on the shaft of the ratchet-wheel and engaging with a toothed rack 3', guided in the frame of the machine, transfers the shifting movement of the ratchet-wheel to the said rack. At the end of the line a block 3'', provided on the rack, reaches a pin 6'' of lever 5, referred to heretofore, which imparts the shifting movement to the register as described with reference to Figs. 1, 2, and 3.

I am not aware that prior to my invention an apparatus for justifying lines has been known in which a register containing signs or marks each indicating the number and size of spaces required to justify any line is controlled by setting a line so as to bring into sight of the operator or into relation to an automatic space-feeding device that part of the register which contains the signs or marks just indicating the number and size of spaces required to justify the set line.

What I do claim as my invention, and desire to secure by Letters Patent, is—

1. In an apparatus employing movable spaces of different sizes to justify composed lines a space selecting or predetermining register provided with different signs or marks at different places, indicating each independently of the other by its place a particular size and by its character a certain number of that size of spaces, substantially as described.

2. In an apparatus employing movable spaces of different sizes to justify composed lines a space selecting or predetermining register provided with readable signatures at different places, indicating each independently of the other by its place a particular size and by its readable signature the number of that size of spaces, substantially as described.

3. In an apparatus employing movable spaces of different sizes to justify composed lines a space selecting or predetermining register provided with indentures of different depths at different places, indicating each independently of the other by its place a particular size and by its depth a certain number of that size of spaces, substantially as described.

4. In an apparatus employing movable spaces of different sizes to justify composed lines a space selecting or predetermining register provided with projections of different heights at different places, indicating each independently of the other by its place a particular size and by its height a certain number of that size of spaces, substantially as described.

5. In an apparatus employing movable spaces of different sizes to justify composed lines a space selecting or predetermining register provided with different signs or marks at different places, indicating each independently of the other by its place a particular size and by its character a certain number of that size of spaces, and means for selecting that portion of the register which contains the signs or marks indicating the spaces to justify a given line, substantially as described.

6. In an apparatus employing movable spaces of different sizes to justify composed lines a space selecting or predetermining register provided with different signs or marks at different places, indicating each independently of the other by its place a particular size and by its character a certain number of that size of spaces, and means for bringing into sight of the operator that portion of the register which contains the signs or marks indicating the spaces required to justify a given line, substantially as described.

7. In an apparatus employing movable spaces of different sizes to justify composed lines a space selecting or predetermining register provided with different signs or marks at different places, indicating each independently of the other by its place a particular size and by its character a certain number of that size of spaces, a space-feeding mechanism, and means for presenting or connecting to the said space-feeding mechanism that portion of the register which contains the signs or marks indicating the spaces required to justify a given line, substantially as described.

8. In an apparatus employing movable spaces of different sizes to justify composed lines a space selecting or predetermining register provided with different signs or marks at different places, indicating each independently of the other by its place a particular size and by its character a certain number of that size of spaces, means for selecting that portion of the register which contains the signs or marks indicating the spaces required to justify a given line, a space-feeding mechanism, and means for stopping the line at each spacing, substantially as described.

9. In an apparatus employing movable spaces of different sizes to justify composed lines a space selecting or predetermining register provided with different signs or marks at different places, indicating each independently of the other by its place a particular size and by its character a certain number of that size of spaces, and means for shifting the register by the line to be justified, substantially as described.

10. In an apparatus employing movable spaces of different sizes to justify composed lines a space selecting or predetermining register provided with different signs or marks at different places, indicating each independently of the other by its place a particular size and by its character a certain number of that size of spaces, and means for shifting the register in one direction by the line to be justified and in another direction in accordance with the number of word-spacings contained in that line, substantially as described.

11. In an apparatus employing movable spaces of different sizes to justify composed lines a space selecting or predetermining register provided with different signs or marks at different places, indicating each independently of the other by its place a particular size and by its character a certain number of that size of spaces, a plate or block for adjusting the line to be justified, and means for controlling the register by the line-adjusting movement, substantially as described.

12. In an apparatus employing movable spaces of different sizes to justify composed lines a space selecting or predetermining register provided with different signs or marks at different places, indicating each independently of the other by its place a particular size and by its character a certain number of that size of spaces, a space-feeding mechanism, means for presenting or connecting to the said space-feeding mechanism that portion of the register which contains the signs or marks indicating the spaces required to justify a given line, and means for controlling the space-feeding mechanism by the register, substantially as described.

13. In an apparatus for justifying lines composed by setting-machines the combination of movable stops controlling the feeding of spaces, ratchet devices intermittingly actuating the said stops, and means for oscillating the said ratchet devices by the common key-stroke of the setting-machine, substantially as and for the purposes described.

14. In an apparatus for justifying lines composed by setting-machines the combination of movable stops controlling the feeding of spaces, ratchet devices intermittingly actuating the said stops, and an escapement or catch for stopping the line at each spacing, substantially as and for the purposes described.

15. In an apparatus for justifying lines composed by setting-machines the combination of movable stops controlling the feeding of spaces, an escapement or catch for stopping the line at each spacing, and means for actuating the said escapement or catch by the common key-stroke of the setting-machine, substantially as and for the purposes described.

16. In an apparatus for justifying lines composed by matrix or die setting machines an inclined matrix or die channel for assembling the provisional line, means for justifying the same and means for forwarding and delivering the line by gravity, substantially as and for the purposes described.

17. In an apparatus for justifying lines composed by matrix or die setting machines the combination of an inclined matrix or die channel, a space-feeding mechanism, and an escapement or catch for stopping at each spacing the line descending by gravity, substantially as and for the purposes described.

18. In an apparatus for justifying lines composed by matrix or die setting machines the combination of an inclined matrix or die channel, a space-feeding mechanism, and an escapement or catch for detaching word by word at each spacing, the matrices or dies descending by gravity, substantially as and for the purposes described.

19. In an apparatus for justifying lines composed by matrix or die setting machines the combination of an inclined matrix or die channel, a space-feeding mechanism, an escapement or catch for stopping at each spacing the line descending by gravity and means for withdrawing the provisional spaces, substantially as and for the purposes described.

20. In an apparatus for justifying lines composed by matrix or die setting machines the combination of a horizontal matrix or die assembling receptacle, an inclined channel for justifying the line and delivering the same by gravity, and means for bringing the assembling-receptacle into line with the said inclined channel, substantially as and for the purposes described.

21. In an apparatus for justifying lines composed by matrix or die setting machines the combination of an inclined matrix or die channel, an escapement or catch for stopping at each spacing the line descending by gravity, and a letter-matrix or letter-die provided with a nick or recess in its upper shoulder, substantially as and for the purposes described.

22. In an apparatus for justifying lines composed by matrix or die setting machines the combination of an inclined matrix or die channel, a space provided with a nick and means for withdrawing the space by way of the said nick, substantially as and for the purposes described.

23. In an apparatus for justifying lines composed by setting-machines the combination of two levers swinging in opposite directions and pushers or drivers connected to the said levers and entering into the type-channel, substantially as and for the purposes described.

24. In an apparatus for justifying lines composed by setting-machines the combination of provisional spaces extending at the top and the bottom of the line and bridges for stopping the line at each spacing, substantially as and for the purposes described.

25. In an apparatus for justifying lines composed by setting-machines the combination of provisional spaces extending at the top and the bottom of the line, movable bridges for stopping the line at each spacing, and means for actuating the said bridges at each spacing, substantially as and for the purposes described.

In witness whereof I have hereunto signed my name in the presence of two subscribing witnesses.

ERNST WENTSCHER.

Witnesses:
CHAS. H. DAY,
WM. HAUPT.